July 21, 1936.  R. R. WEBBER  2,048,579
VEHICLE
Filed May 8, 1933  2 Sheets-Sheet 2
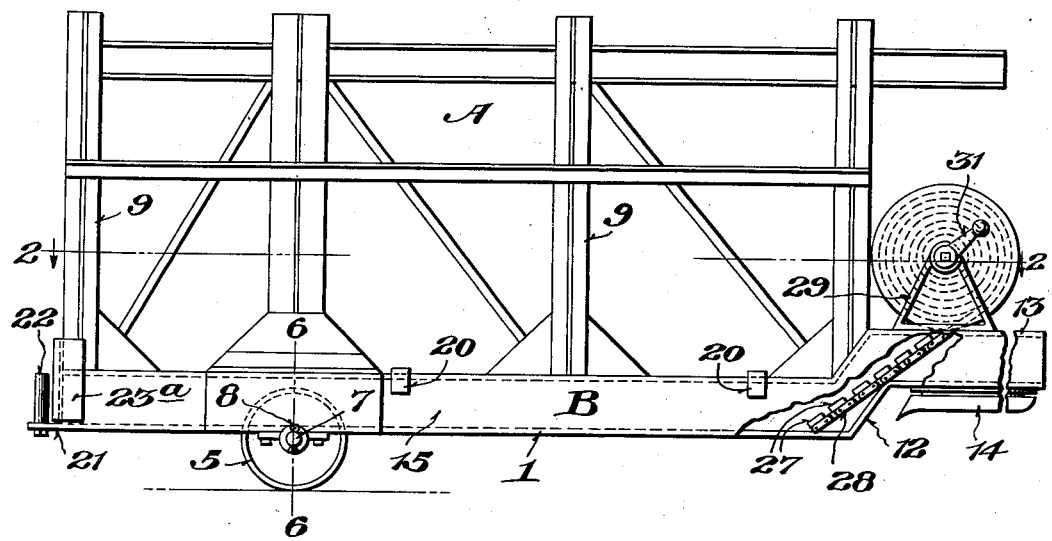
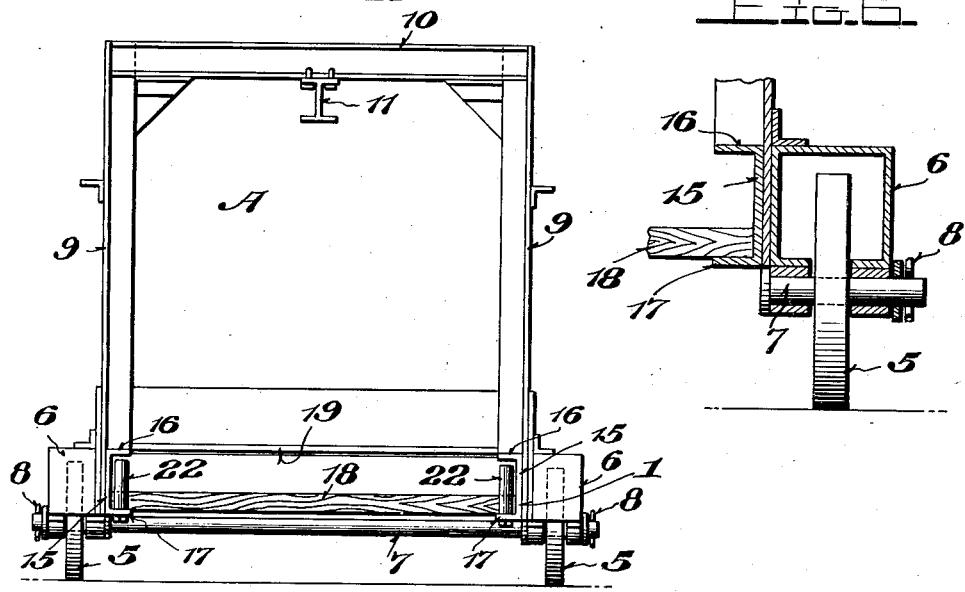
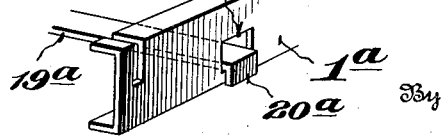
Inventor
Ray R. Webber,
By William T. Geier
Attorney Patented July 21, 1936

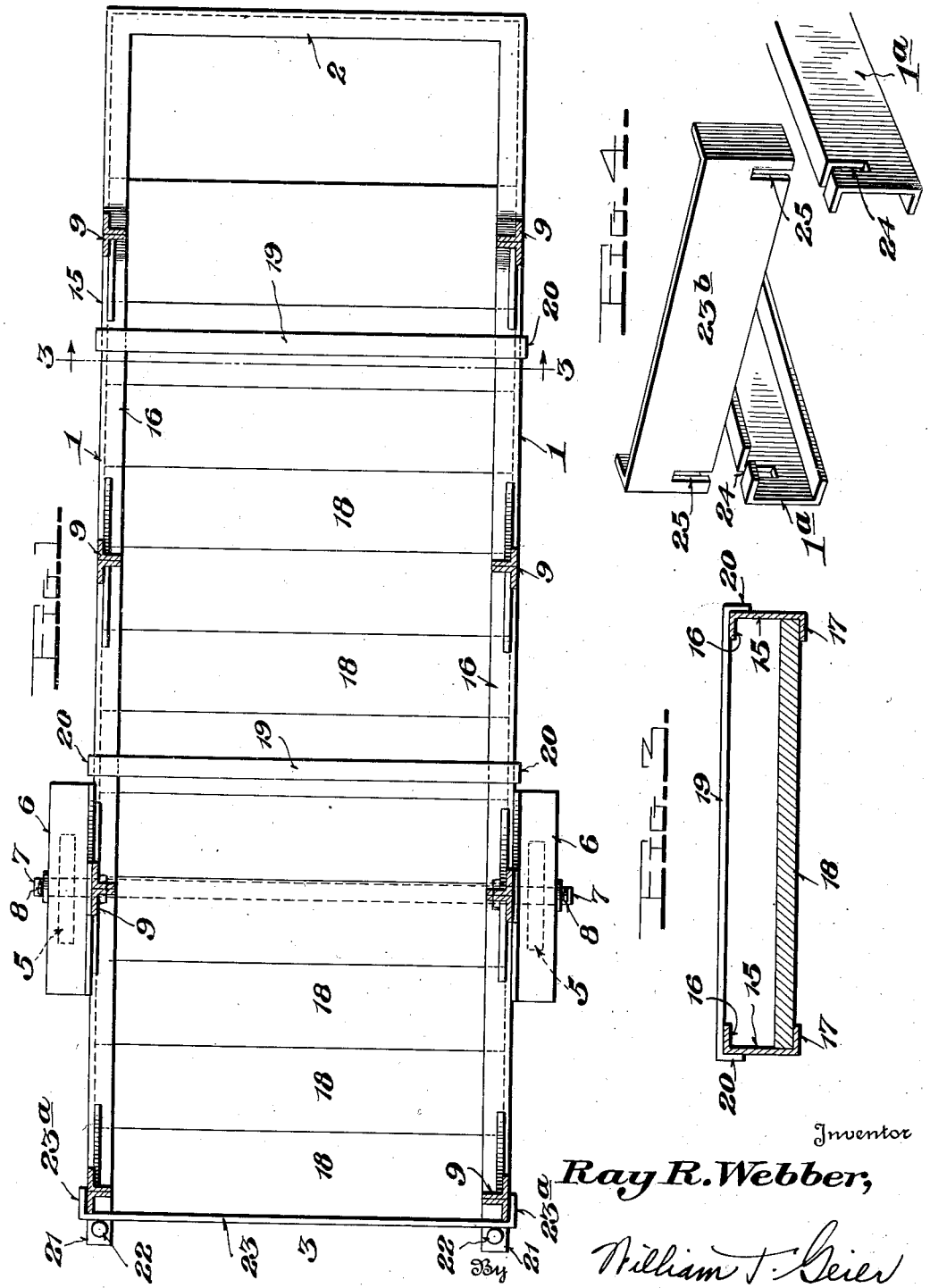

2,048,579

UNITED STATES PATENT OFFICE 2,048,579

VEHICLE

Ray R. Webber, Cleveland, Ohio, assignor of one-half to Hugo W. Grunwald, Cleveland, Ohio Application May 8, 1933, Serial No. 670,011

4 Claims. (Cl. 296—1)

This invention relates to improvements in vehicles of which the following is a specification.

The instant application is a continuation in part of my prior application for Letters Patent of the United States, filed April 11, 1932 and bearing Serial Number 604,628, now Patent No. 1,973,030, dated September 11, 1934.

The primary important object of this invention is to provide a vehicle of the above character having a removable bottom through which the same may be quickly and easily loaded or unloaded with a minimum expenditure of labor and power.

Another important object of this invention is to provide a vehicle of the above character, which is so constructed as to permit the same to be initially disposed over a load at the point at which the same is to be carried in the vehicle, and thereby to eliminate the necessity of subsequently adjusting the load to meet varying road conditions encountered during transportation.

Another important object of this invention is to provide a vehicle of the above character having a normally open bottom and removable load supporting members for closing the latter during transportation of a load.

Another important object of this invention is to provide a vehicle of the above character having removable load supporting members and frame bracing means coacting to prevent undue movement of the sides of the vehicle toward and away from each other, whereby to relieve the vehicle of varying stresses and strains encountered during transportation.

A further important object of this invention is to provide a vehicle of the above character which may be readily loaded through the bottom thereof and within the confines of the same, defined by the sides and ends of the frame, and in which the removable bottom or load supporting and bracing means may quickly and easily be moved to its operative or inoperative position.

A still further object of this invention is to provide a vehicle of the above character which is of simple and practical construction and one which may be readily manufactured and placed in use at a reasonable cost.

These and other objects and advantages will be readily apparent throughout the following description and drawings; in which Figure 1 is a top plan view of the improved vehicle with the up-rights in section;

Figure 2 is a rear elevation of the vehicle;

Figure 3 is a sectional view taken on line 3—3 of Figure 1 and disclosing means for bracing the sides of the vehicle against separating movement;

Figure 4 is a perspective view of a modified form of combined end-gate and brace;

Figure 5 is a side elevation, partly broken away, to show a modified form of removable bottom for the vehicle;

Figure 6 is a fragmentary sectional view taken on line 6—6 of Figure 5; and

Figure 7 is a fragmentary perspective view of a modified form of brace member for the sides of the vehicle.

Referring in detail to the drawings, A indicates generally a vehicle having a chassis B formed preferably of a single inwardly facing channeled steel beam, or the like. The chassis is of substantially rectangular configuration, when viewed in plan, and is provided with sides 1, a closed front end 2, and an open rear end 3.

The chassis B of the vehicle is supported adjacent its rear end by traction wheels 5, of any suitable construction, which are partially incased within housings 6 secured to the outer faces of the sides 1. The wheels 5 are connected beneath the lower faces of the chassis by a removable axle 7, the latter being of any suitable construction, but in the present disclosure having its ends locked in operative position by removable keys 8.

Rising vertically at spaced intervals along each side of the chassis B are a plurality of up-rights 9, each opposed pair of which have their upper ends connected by cross-beams 10, the latter being adapted to support a longitudinally extending trackway 11 formed to receive a travelling hoist, not shown. The superstructure of the vehicle is more fully described and claimed in my copending application and further detailed description thereof is deemed unnecessary in the instant application.

At predetermined distance rearwardly of the front end of the chassis, the sides 1 thereof are inclined upwardly and forwardly as at 12 and terminate in a platform 13 to provide a support for one-half of a fifth wheel construction 14, said platform being disposed above, but in the same plane as the sides 1, whereby to permit the vehicle to be detachably coupled with a power tractor unit, not shown. It is to be understood, that any other suitable means may be utilized for supporting the front end of the vehicle and for driving the latter.

Positioned between the sides 1, and extending into the opposed inwardly facing channels 15 formed by the upper and lower flanges 16 and 17 respectively of the sides, is a series of transversely arranged removable floor-boards 18 adapted to form a closure for the open bottom of the vehicle. Disposed over the floor-boards and detachably connecting the sides 1 of the vehicles are a plurality of spaced brace members 19 having downwardly turned ends 20 adapted to prevent movement of the sides in a direction away from each other, while movement of the sides 1 toward each other is prevented by the transverse positioning of the floor-boards.

Each of the free ends of the sides 1 is provided with a rearwardly projecting part 21 adapted to support a vertically extending pin 22 spaced from the adjacent free end of the vehicle.

Positioned transversely across the open rear end of the vehicle and between the pins 22 and adjacent free ends of the sides 1, is a removable combined end-gate and brace 23 having its opposite ends 23a disposed at substantially right-angles thereto and engaging the sides to further brace the latter and to prevent separating movement thereof.

In Figure 4 of the drawings, is disclosed a modified form of a combined end-gate and brace for the open rear end of the vehicle. In this form the sides 1a are each provided adjacent their rear ends with a vertical kerf or slot 24 extending part way therethrough. The end-gate 23b is provided with corresponding similar kerfs or slots 25, the bottom walls of which latter are adapted to engage with the corresponding bottom walls of the slots 24, whereby to prevent movement of the sides of the vehicle toward or away from each other when the end-gate is placed in operative position.

In Figure 5, is disclosed a modified form of removable flooring in which the transverse boards 27 are flexibly connected at 28 to provide a removable closure for the open bottom of the vehicle. In this form, a pair of spaced brackets 29 are mounted upon the platform 13 and are adapted to rotatably support a shaft 30 operable by means of a hand crank 31, or other suitable means. One end of the flexible flooring is secured to the rotatable shaft 30 while its opposite end is free to be received and guided to closing position by the inwardly facing channels 15 of the sides 1, upon actuation of the crank 31. This arrangement permits the removable flooring to be quickly and easily moved to its operative or inoperative position.

Figure 7 of the drawings, discloses a modified form of securing the intermediate braces 19a in position. Each of the sides 1a is provided with a series of spaced openings 26 alined with a series of similar openings in the opposite side of the chassis. The downturned ends 20a of the braces 19a extend through the openings 26 and engage the outer faces of the sides 1a to prevent separating movement of the latter.

In the operation of loading the vehicle, the end-gate, braces and flooring are first removed from the sides of the chassis. The vehicle is then backed over the load to the approximate point within the vehicle at which the same is to be carried. This initial maneuvering of the vehicle, eliminates subsequent shifting of the load in order to balance the vehicle to accommodate the latter to varying road conditions.

After the vehicle has been properly positioned over the load, the latter is elevated through the open bottom by means of any suitable hoisting mechanism not shown to a point within the vehicle and above the sides 1. While the load is still retained in such elevated position, the floor-boards are disposed between the sides 1 to close the open bottom of the vehicle. The intermediate braces and end-gate are then placed in their proper positions, whereupon the load is lowered until the same rests upon and is solely supported by the floor-boards. The hoisting mechanism is then disconnected from the load.

Upon reaching its destination, the vehicle is moved to the place where the load is to be deposited and the operation is then reversed, viz: the load is elevated and retained above the floor-boards, the latter together with the braces and end-gate are removed and the load is then lowered to its proper position on the ground, through the open bottom of the vehicle. A vehicle constructed and operated in accordance with the foregoing has particular utility in the moving and placing of heavy objects, such as, machinery, packing cases or the like. However, it is to be noted that same may be readily adapted to the expeditious handling of other loads or materials.

It is to be expressly understood that various modifications of the invention may be resorted to within the spirit and scope of the invention as announced by the following claims, the various forms of the invention herein described being merely by way of illustration and are not to be considered as an exhaustive enumeration of all ways by which the invention may be practiced.

What is claimed is:

1. A vehicle of the character described, comprising a substantially U-shaped body when viewed in plan having traction means and having one end thereof and its bottom open and completely unobstructed to permit a load to be moved upwardly through the latter, removable floor boards adapted to be supported by the sides of said body for closing said open bottom to prevent inward movement of said sides toward each other and for supporting a load thereon, and a removable combined end gate and brace adapted to close said open end and to prevent movement of the sides of the body away from each other when the latter is subjected to varying stresses and strains caused by a load being transported.

2. A vehicle of the character described, comprising a substantially U-shaped body when viewed in plan, having traction means, removable floor boards, means on each side of the body for supporting the ends of the floor boards in engagement with the said body sides whereby to limit movement of said sides toward each other, one end of the body and the space between said floor board supporting means being free and completely unobstructed to permit the vehicle to be moved to receive a load in its said open end and the load then moved upwardly to points above the location of the floor boards when the latter are in load supporting position, and means having portions to engage the outer faces of the sides of the body to hold said sides against movement away from each other, said last named means being removable and engageable with the sides at points throughout the lengths of the sides in accordance with the length of the load.

3. A vehicle of the character set forth in claim 2, wherein the means for holding the body sides against movement away from each other is composed of bars that extend transversely of and seat on the tops of the sides and have downturned ends which engage the outer faces of the sides.

4. A vehicle of the character described, comprising a substantially U-shaped body when viewed in plan having traction means, removable floor boards, means on each side of the body for supporting the ends of the floor boards in engagement with the said body sides whereby to limit movement of said sides toward each other, one end of the body and the space between said floor board supporting means being free and completely unobstructed to permit the vehicle to be moved to receive a load in its said open end and the load then moved upwardly to points above the location of the floor boards when the latter are in load supporting position, each of the sides having a series of openings disposed along the lengths thereof, and bars extending transversely of the sides and having portions which extend through selected openings and engage the outer faces of the sides to hold the latter against movement away from each other.

RAY R. WEBBER.